UNITED STATES PATENT OFFICE.

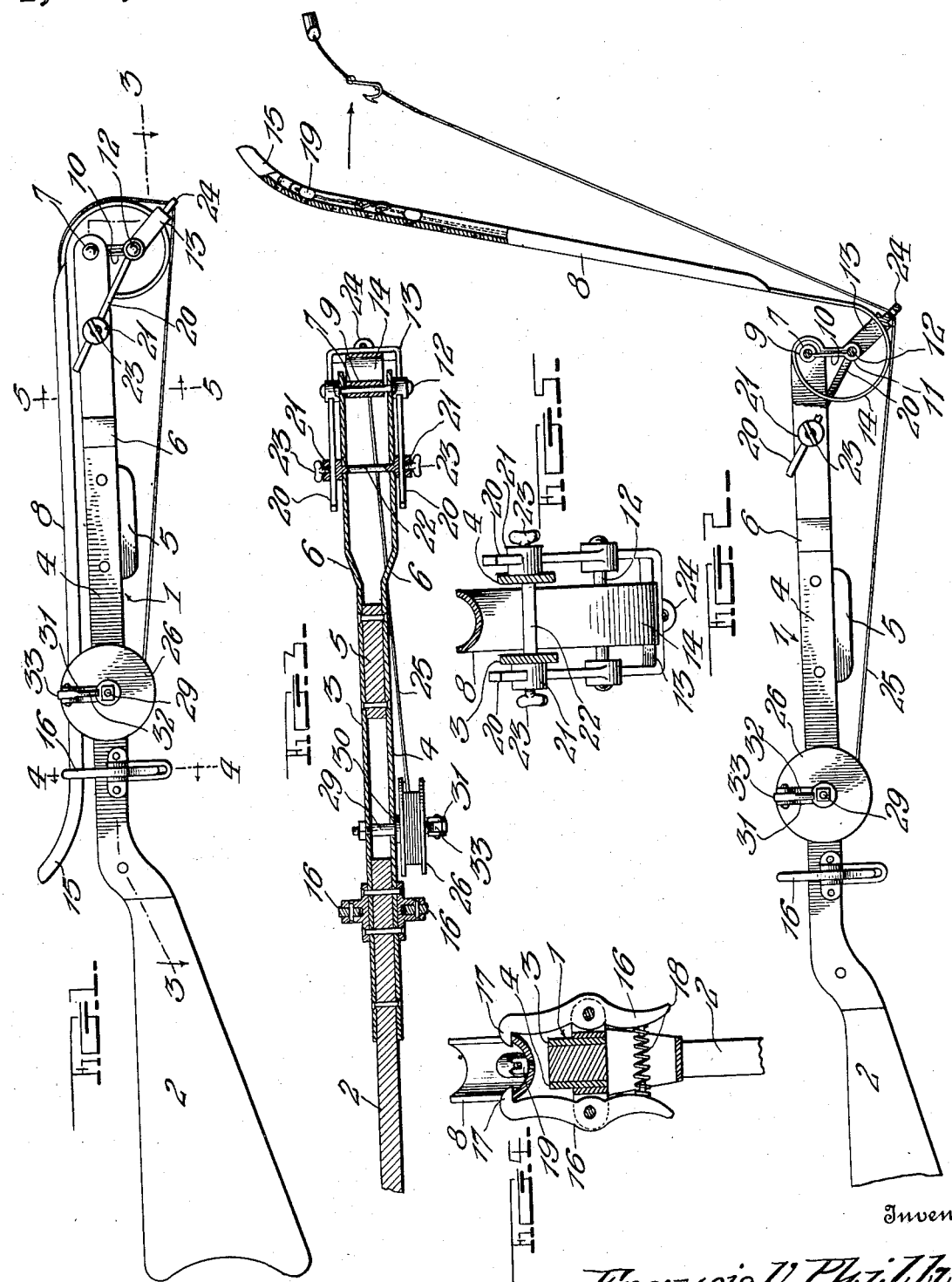
F. V. PHILLIPS.
FISHING REEL.
APPLICATION FILED MAY 18, 1914.
1,140,608.
Patented May 25, 1915.
2 SHEETS—SHEET 1.

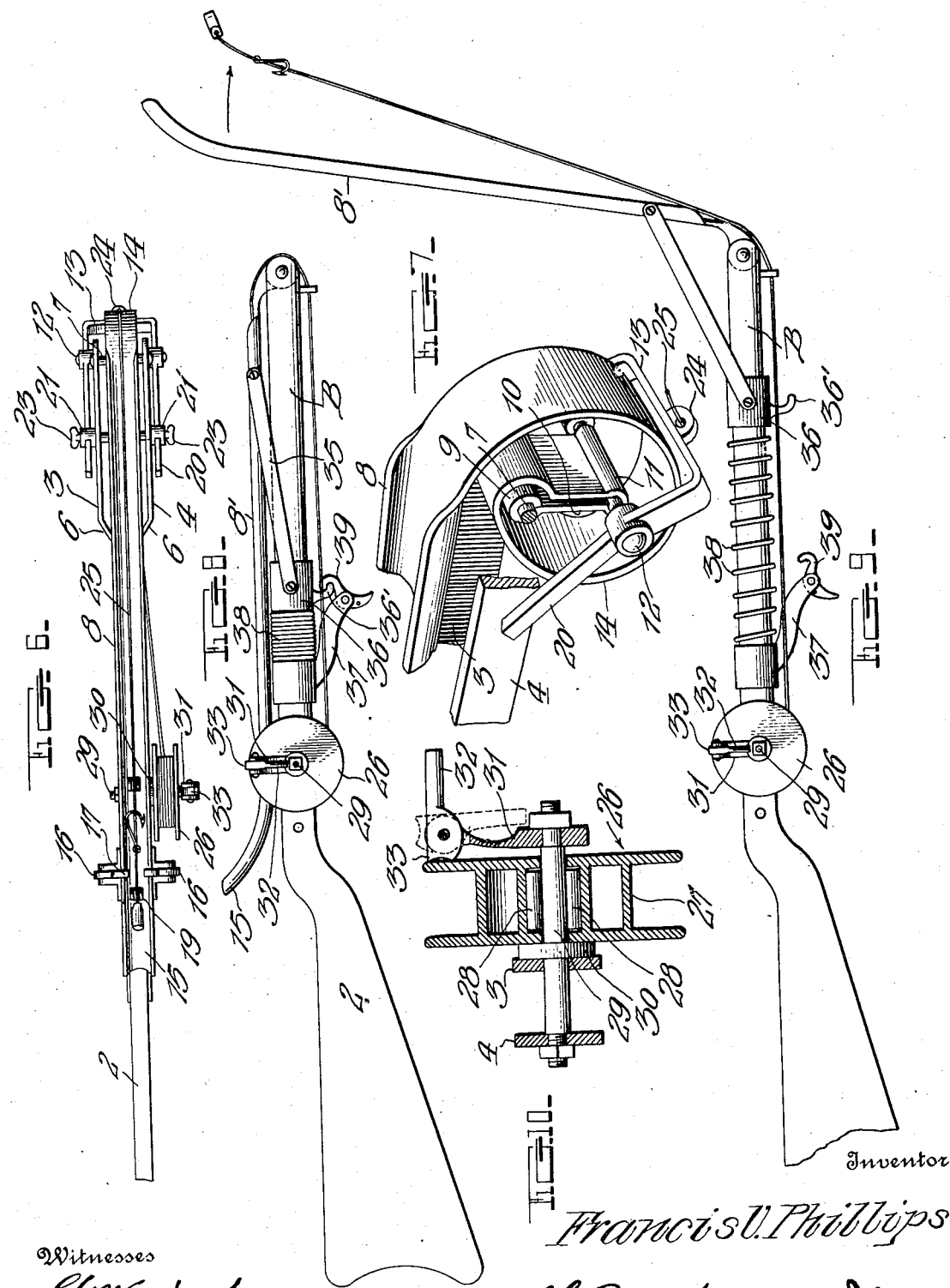

FRANCIS V. PHILLIPS, OF ORLANDO, FLORIDA.

FISHING-REEL.

1,140,608.

Specification of Letters Patent.   Patented May 25, 1915.

Application filed May 18, 1914.   Serial No. 839,367.

*To all whom it may concern:*

Be it known that I, FRANCIS V. PHILLIPS, a citizen of the United States, residing at Orlando, in the county of Orange and State of Florida, have invented certain new and useful Improvements in Fishing-Reels; and I do declare the following to be a full, clear, and exact description of the invention, such as will enable others skilled in the art to which it appertains to make and use the same.

This invention relates to improvements in mechanical bait casters for propelling the bait and unreeling the line.

The main object of the invention is to provide a mechanical device for the use of fishermen for making a long distance cast of the sinker and baited hook which is especially useful for shore fishing, avoiding the necessity of the fishermen wading in the water to throw their line to the desired distance.

Another object is to provide a device of this character with means for varying the distance of the cast and for so controlling it that the operator may become very expert in casting to any desired point.

Another object is to provide a mechanical bait caster with means for directing the line of travel of the baited hook carrying end of the line to cause it to curve out over the water when projected.

With these and other objects in view, the invention consists of certain novel features of construction, combination and arrangement of parts as will be more fully described and claimed.

In the accompanying drawings: Figure 1 represents a side elevation of this improved device with the projecting element shown in closed inoperative position; Fig. 2 is a similar view partly in section with the projector in extended or operative position; Fig. 3 is a longitudinal horizontal section thereof taken on the line 3—3 of Fig. 1; Fig. 4 is a transverse vertical section taken on the line 4—4 of Fig. 1; Fig. 5 is a transverse section taken on line 5—5 of Fig. 1; Fig. 6 is a plan view of the device; Fig. 7 is a detail perspective view on an enlarged scale showing the connected end of the projector; Fig. 8 is a side elevation partly in section showing a slightly different form of the invention with the projector in closed position; Fig. 9 is a similar view with the projector in open operative position; and Fig. 10 is a vertical section of the reel used in connection with this caster.

In the embodiment illustrated, this improved device is shown constructed in the form of a spring gun 1 the stock 2 of which may be made of wood or other suitable material, the barrel portion being formed of laterally spaced side bars 3 and 4 preferably constructed of steel and which has a gripping member 5 disposed between them intermediately of their ends and projecting beyond the lower edges thereof as shown clearly in Fig. 1. These bars 3 and 4 have their outer ends offset outwardly by inclined or diverging elements 6, said offset ends extending in parallel planes from the outer ends of said elements 6 and in planes parallel with the body portion of the bars. A stub shaft or pivot pin 7 connects the outer extremities of said bars 3 and 4 and on this shaft is mounted a projector in the form of a spring arm 8 having one end rolled or bent to form a bearing 9 which encircles the pin 7 and this arm is then extended downwardly to form a straight member 10 at the end of which it is curved to form another bearing 11 to receive a pivot pin 12 on which a yoke 13 is mounted for controlling the tension of said spring arm in a manner to be described.

After the inner end of the arm 8 is bent to form the bearing 11 it is extended parallel with the member 10, is curved over the bearing 9 and brought around through the yoke 13 producing a spring coil 14 which places the arm 8 under tension and causes it to fly outward when released into the position shown in Fig. 2. The free end of the arm 8 is curved longitudinally outward as shown at 15 and is curved laterally as shown in Fig. 4, said lateral curvature gradually merging into a flat portion formed at the other end of the arm. The longitudinal curvature of the free end of arm 8 prevents the cast from going upward and gives it an easy curve out over the water when the gun is held in substantially horizontal position. This lateral curvature of the arm serves to reinforce and strengthen it and also to form a trough-like receptacle for housing the sinker and hook when in inoperative position as shown in Fig. 1.

Two spring pressed triggers 16 are mounted on opposite sides of the gun barrel near its connection with the stock thereof and the hook ends of these triggers are positioned to engage the opposite curved edges of the lever or arm 8 when in inoperative position to hold said arm against projection as shown clearly in Fig. 4. These triggers are shown in detail in said Fig. 4 being pivotally mounted midway their ends with hooks 17 at one end for engagement with the arm 8, their other ends being flared outwardly and held in spaced relation by a coiled spring 18 which forces said ends apart and the hook ends inwardly to adapt the triggers to reliably clamp the arm 8.

The yoke 13 is mounted on the pivot pin 12 and as shown, is substantially U-shaped being connected intermediately of its ends with said pivot pin and having its free ends projecting at an oblique angle from said pin and extending longitudinally of said yoke to form adjusting arms 20 which extend on opposite sides of the enlarged free ends of the bars 3 and 4 and pass through apertures in the heads 21 of a double handed bolt 22 which extends through said bars and projects on opposite sides thereof. These arms 20 are adjustably held in these apertured heads 21 by means of set screws 23 which are screwed home to clamp said arms securely to said heads after the yoke has been adjusted to regulate the spring coil 14. When the device is not in use, these yoke arms 20 are released by loosening the screws 23 which permits the arm 8 to be swung down into closed position without any tension being placed on the spring portion thereof and when swung into this position, it is held closed by the triggers 16. Sinker holding lugs 19 are mounted for longitudinal adjustment on the arm 8 and their position may be varied to change the distance of the cast, also the cast may be gaged by such adjustment and thus enable the user to become an expert in casting to any desired point.

An apertured ear 24 extends laterally from the cross bar of the yoke 13 and forms a guide for the fishing line 25 which is carried by a reel 26 mounted at one side of the gun barrel.

The reel herein shown, comprises a drum 27 having anti-friction rollers 28 in the hub thereof and is mounted on a shaft 29 which extends through the side bars 3 and 4 and is provided on the portion between said side bars with a spacing element 30. This shaft 29 projects at one end beyond the reel 26 and has a spring arm 31 revolubly mounted thereon and at the upper end of which is pivotally mounted a handle 32. The inner end of this handle 32 is provided with a cam 33 adapted when the free end of the handle is swung upwardly to contact with the reel drum 27 whereby the reel may be turned for winding the line thereon. When it is desired to release the line when the device is to be used for casting, this handle 32 is swung downwardly thereby disengaging the cam 33 thereof from the drum 27 thus permitting said drum to turn freely on said anti-friction rollers. It will also be obvious that this handle 32 may be used as a brake for controlling the unwinding of the line, said handle being raised gradually and gently for this purpose to cause the desired amount of friction to be exerted on the reel drum.

In the use of this invention, the parts being in the position shown in Fig. 1 when it is desired to cast the line some distance from the position occupied by the operator, the yoke arms 20 are adjusted to exert the desired tension on the coiled spring 14 and the triggers 16 are released by pressing on their outwardly curved ends thereby disengaging the hooks 17 thereof from the arm 8. This arm 8 on which the baited hooks and sinker are disposed is projected outwardly by the tension of the spring 14 into the position shown in Fig. 2 and this movement of this arm 8 causes the bait and sinker to be thrown with considerable force and projected to any desired distance according to the tension of the spring 14, it being understood that before the arm 8 is released, the handle of the reel has been moved downwardly to release the drum to permit the line to feed freely therefrom, said line being guided through the apertured ear 24 on the yoke 13.

This device may be made in different sizes suitable for casting from shores or from boats and when used, the fishermen may remain seated thereby avoiding the danger of upsetting the small boat.

While this device is described for use by fishermen, it is obvious that it may also be constructed on a reduced scale and used as a toy.

In the form shown in Figs. 7 and 8 the projector 8' is shown pivotally mounted on the free end of a gun barrel B. A link 35 is pivotally connected at one end with said projector and at its other end with a slide 36 mounted on the barrel B and between the rear end of which and a fixed catch 37 is disposed a coiled spring 38. The slide 36 has a hook-shaped finger 36' which is adapted to be engaged by a trigger 39 for holding the spring coil 38 in compressed condition and the projector closed.

When the trigger is actuated to release the slide 36, the spring 38 will exert its tension to force said slide outwardly and consequently to project the projector 8' and cast the line carried thereby.

I claim as my invention:

1. A bait caster comprising a supporting structure, a line projecting arm, a coiled spring connected at one end with one end of said arm, laterally spaced bearings formed at the other end of said spring, pins extending through said bearings and carried by said supporting structure, a yoke encircling said spring and fulcrumed intermediately of its ends on one of said pins with the free ends of the arms projecting beyond said fulcrum, apertured means on said structure through which said arms extend, and means for adjustably locking said arms in said apertured means for varying the tension of said spring.

2. A caster comprising a supporting structure, a line projecting arm merging at one end into a coiled spring terminating in laterally spaced bearings, pins extending through said bearings carried by said supporting structure, a yoke encircling said spring and fulcrumed intermediately of its ends on one of said pins with the free ends of the arms projecting beyond said fulcrum, apertured means on said structure through which said arms extend, and means for adjustably locking said arms in said apertured means for varying the tension of said spring.

In testimony whereof I have hereunto set my hand in presence of two subscribing witnesses.

FRANCIS V. PHILLIPS.

Witnesses:
P. P. Schwartz,
C. P. Dickinson.